UNITED STATES PATENT OFFICE.

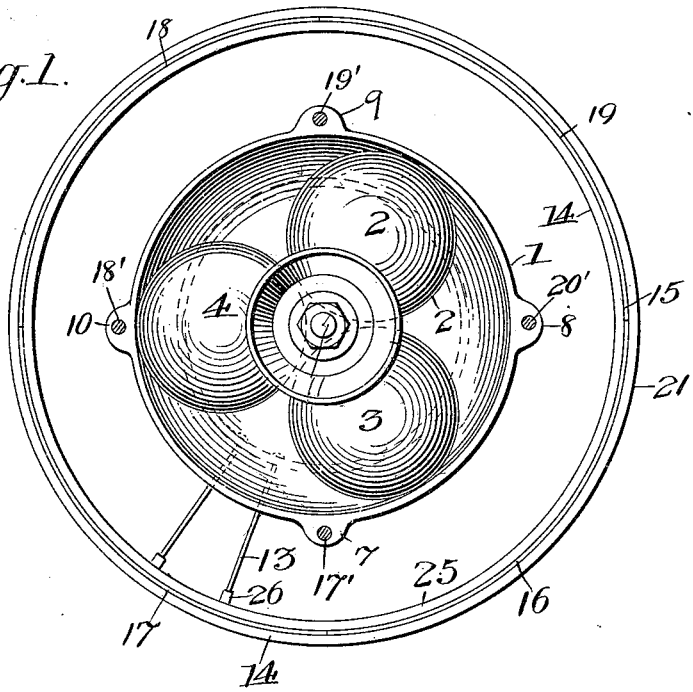

SAMUEL SWEENEY, OF LOS ANGELES, CALIFORNIA.

WHEEL FOR VEHICLES.

SPECIFICATION forming part of Letters Patent No. 658,879, dated October 2, 1900.

Application filed December 18, 1899. Serial No. 740,846. (No model.)

*To all whom it may concern:*

Be it known that I, SAMUEL SWEENEY, a citizen of the United States, residing in the city of Los Angeles, county of Los Angeles, and State of California, have invented a new and useful Improvement in Carriage-Wheels and Wagon-Wheels, &c., of which the following is a specification.

My invention relates to that class of wheels in which three single ball-bearings are inclosed in a hub. They are hollow or shell ball-bearings. The wheel can be taken off without disturbing the ball-bearings. Also a cork tire can be placed and cemented on the rim in three or four parts and a rubber tire cemented on the rim in a groove covering cork, similar to the cushion-tire, thus doing away with valves and air.

In the accompanying drawings, Figure 1 is a hub and wheel with part of the case cut away; Fig. 2, a side view of axle and hub and bearing, &c.

1 is one-half of the hub. 2 3 4 are the ball-bearings. 5 is the bearing for balls to run on, which is screwed onto axle. 6 is the axle. 11 is a screw-bolt to keep bearing 5 in its place. 24 is a flange or washer for bolt 11. 12 is the rim on hub to fasten wires from rim of hub to rim of wheel 14. 13 represents the wire spokes reaching from rim 14 to rim on hub 12. 14 is the rim of the wheel. 15 is a cork tire which is cemented onto rim of wheel 14. 16 17 18 19 are the separate parts of the cork tire. 17' are clenched bolts. The two halves of the hub are fastened together on the outside center rim of hub. 7, 8, 9, and 10 are the hollow holes through the two halves of the hub, which are clenched together by bolts 17', 18', 19', and 20'. 21 is the rubber tire, which is cemented onto rim of wheel into a groove in rim 14, which covers cork. 22 is an axle or axle-spindle. 23 is a nut-bolt which is screwed onto axle or spindle 22 and bearing 5. 23 is the same nut as shown above.

The hub proper is composed of two conical parts $a$ and $b$ with their apexes $c$ $d$ inwardly disposed, and through these extend a spindle screw-threaded for the reception of a nut at its outer end. The conical sections have recesses $f$ in their larger portions, against which press the shoulder $g$ of the axle and the retaining-nut $h$. The shells 1 have apertures in their sides into which snugly fit the aforesaid conical sections. If thought best, each section, with its conical bearing, might be made integral.

Having thus described my invention, what I claim as new is—

1. In wheels, a hub composed of two curved shells having flanges at their meeting edges and fastening devices therefor, and perforated midway rims to receive the spokes, each shell also having an aperture in its side, conical bearings inserted in said apertures and balls inclosed within the shells and resting on said bearings, all arranged as set forth.

2. In wheels, a hub composed of two curved shells having flanges at their meeting edges and fastening devices therefor, and perforated midway rims to receive the spokes, each shell also having an aperture in its side, conical bearings having recesses in their larger ends inserted in said apertures and balls inclosed within said shells and resting on said bearings, all arranged as set forth.

SAMUEL SWEENEY.

Witnesses:
D. NEUHART,
DAVID CARR.